United States Patent
Duchastel et al.

(10) Patent No.: US 10,425,373 B2
(45) Date of Patent: Sep. 24, 2019

(54) SYSTEMS AND METHODS FOR PRIORITIZING MESSAGES FOR CONVERSION FROM TEXT TO SPEECH BASED ON PREDICTIVE USER BEHAVIOR

(71) Applicant: Citrix Systems, Inc., Fort Lauderdale, FL (US)

(72) Inventors: Thierry Duchastel, Cooper City, FL (US); Marcos Alejandro Di Pietro, Hallandale Beach, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 42 days.

(21) Appl. No.: 15/654,525

(22) Filed: Jul. 19, 2017

(65) Prior Publication Data

US 2019/0028421 A1 Jan. 24, 2019

(51) Int. Cl.
*G10L 13/02* (2013.01)
*H04L 12/58* (2006.01)
*G06Q 10/10* (2012.01)
*G06N 20/00* (2019.01)
*G10L 13/04* (2013.01)

(52) U.S. Cl.
CPC .......... *H04L 51/26* (2013.01); *G06N 20/00* (2019.01); *G06Q 10/107* (2013.01); *G10L 13/02* (2013.01); *G10L 13/04* (2013.01)

(58) Field of Classification Search
CPC ....................................................... G10L 13/02
USPC ........................................................ 704/258
See application file for complete search history.

(56) References Cited

U.S. PATENT DOCUMENTS

| | | | | |
|---|---|---|---|---|
| 7,069,259 B2* | 6/2006 | Horvitz | ................ | G06Q 10/107 706/25 |
| 7,801,968 B2* | 9/2010 | Wang | ...................... | H04L 51/36 709/206 |
| 8,239,197 B2* | 8/2012 | Webb | ................ | H04M 3/53333 379/88.01 |
| 8,280,995 B2* | 10/2012 | Miyamoto | ............. | G06Q 10/10 704/7 |
| 8,565,820 B2* | 10/2013 | Riemer | ............. | H04M 1/72577 455/345 |
| 8,954,329 B2* | 2/2015 | Labsky | ................... | G10L 13/08 704/260 |
| 9,123,393 B2* | 9/2015 | Zhang | ...................... | G11C 5/02 |
| 9,236,045 B2* | 1/2016 | Labsky | ................... | G10L 13/08 |
| 10,115,388 B2* | 10/2018 | May | .................... | H04M 1/6066 |

(Continued)

*Primary Examiner* — Susan I McFadden
(74) *Attorney, Agent, or Firm* — Foley & Lardner LLP; Christopher J. McKenna

(57) ABSTRACT

Embodiments describe systems and methods for prioritizing messages for conversion from text to speech. A message manager can execute on a device. The message manager can identify a plurality of messages accessible via the device and can determine, for each message of the plurality of messages, a conversion score based on one or more parameters of each message. The conversion score can indicate a priority of each message to convert from text to speech. The message manager can identify a message of the plurality of messages for transmission to a text-to-speech converter for converting the message from text to speech. The message manager can also receive, from the text-to-speech converter, speech data of the message to play via an audio output of the device.

12 Claims, 7 Drawing Sheets

(56) References Cited

U.S. PATENT DOCUMENTS

2003/0035515 A1\* 2/2003 Davutoglu .............. H04L 51/14
379/88.13
2006/0047514 A1\* 3/2006 Yamada ................. G10L 13/04
704/260
2010/0228549 A1\* 9/2010 Herman ................ G10L 13/033
704/260

\* cited by examiner

SYSTEMS AND METHODS FOR PRIORITIZING MESSAGES FOR CONVERSION FROM TEXT TO SPEECH BASED ON PREDICTIVE USER BEHAVIOR

FIELD OF THE DISCLOSURE

The present application generally relates to systems and methods for prioritizing messages for conversion from text to speech. In particular, the present application relates to systems and methods for prioritizing messages for conversion from text to speech based on predictive user behavior.

BACKGROUND OF THE DISCLOSURE

Electronic messages can be sent in text format, for example as emails or text messages. In some instances, a user may prefer to listen to speech or other audio corresponding to the text content of some such messages. Software solutions exist for converting text-based content to speech. However, converting text-based content into speech-based content consumes computer resources that may not always be readily available. It also may be unnecessary to convert every text-based message that a user receives into speech, as the user may prefer to simply read some of the text-based messages.

BRIEF SUMMARY OF THE DISCLOSURE

This disclosure describes techniques for prioritizing messages for conversion from text to speech based on predictive user behavior. The present systems and methods may be used to automatically select a set of text-based messages for conversion to speech, and also may determine an order in which the selected messages should be converted. The selected messages can be delivered from a computing device on which they are stored to a text-to-speech converter even before a user has requested that the messages be converted. In some embodiments, the order in which the messages are selected for conversion into speech can be determined based on predicted behavior of the user.

In some embodiments, a user may access a device that executes a software application configured to allow the user to read text-based messages, such as emails and text messages. In some embodiments, a software application may not have text-to-speech capabilities built-in. Instead, the application may make a remote network call to do the conversion, by sending a message to a remote software application or hardware device that performs the conversion, and receiving the audio corresponding to the speech conversion from the remote software application or hardware device after the conversion has been performed. Because it may be time-consuming and resource-intensive to perform such conversions, it can be advantageous to first predict which message the user will want to listen to next and to send that particular message for conversion even before the user requests that the message be converted to speech. That way the user will not have to wait for the message to be sent to the cloud, for the conversion, and for the speech data to be sent back. This disclosure provides techniques for performing such a predictive conversion.

In some embodiments, when a system for prioritizing messages for conversion from text to speech has no prior knowledge of the user's habits, it may be beneficial to use a non-adaptive algorithm for predicting which message is likely to be read next by the user. Several non-adaptive algorithms are described in this disclosure. An improved predictive conversion may also be achieved by observing the actual usage pattern of the user. This usage data can be used by a machine-learning service, which can then determine the best pattern for that specific end-user. In some embodiments, the machine learning service can be a "cloud-based" service.

There is currently no way to safely check email on many applications and platforms, such as email clients, while driving in a car or performing other activities that make reading text-based content on a computing device difficult, dangerous, or impossible. There are several challenges to the development of applications that easily allow a user to listen to messages that are received as text-based content. This disclosure provides systems and methods that represent technical solutions to these problems. In particular, one problem is to reduce the footprint of such an application on a computing device (e.g., it's size or amount of computing resources required for its execution). To address this, the text-to-speech conversion functionality can be off-loaded to a remote service. Otherwise the application would need to include all of the logic and data for text-to-speech conversion, for potentially multiple languages, which would make the application too burdensome for many computing devices. Off-loading the text-to-speech conversion to a remote service has many other benefits as well, such as allowing for the use of a variety of different text-to-speech services.

One potential downside to using a remote text-to-speech converter is that it can take a noticeable amount of time to send the message over the network to the remote service, for it to be converted, and then for it to be transmitted back to the device. Therefore, it can be advantageous to perform predictive text-to-speech conversion of messages, up to the limit of the cost of the conversion as well as the amount of storage available to pre-cache the converted messages into audio format. Various techniques for selecting a message to be pre-converted to audio can be loosely categorized as either "non-adaptive" or "adaptive." The term "non-adaptive" is used in this disclosure to describe algorithms for predictive conversion that do not change over time in response to input. Conversely, the term "adaptive" is used in this disclosure to refer to an algorithm that may change over time in response to input.

Several types of non-adaptive algorithms are described herein. For example, a temporal algorithm can be non-adaptive. Such an algorithm for determining which message or messages to pre-convert from text to speech in advance of the user actually deciding to read (or listen to) the message can be based on the age of the message. More particularly, the decision to pre-convert a message can be based on when the message was sent or received. As an example, there are many email clients that present messages in chronological order, for instance, from most recent to least recent. It can be presumed that pre-converting the messages from most recent to least recent may be desirable, to the limit of how much pre-caching is desired, as many users typically read their most recent email messages first.

A threaded algorithm incorporates a non-adaptive mechanism for determining which message to pre-convert based on "threads" of messages. A thread of messages is used in this disclosure to denote a chain of back-and-forth messages, typically between the same set of recipients, regarding a specific topic or category. Once an end-user reads one message from a thread, it can be assumed that there is a higher likelihood that the user will soon read another message from the same thread, even if that message occurred much later in the past.

An "unread" algorithm incorporates a non-adaptive technique that can determine whether to pre-convert a message from text to speech based on whether the message is marked as read (e.g., already viewed by the user) or unread (e.g., not yet viewed). For example, in many instances it is more likely for a user to elect to read (or listen to) a message that the user has never seen or listened to before, rather than one that they have already seen or listened to, even if the read message is more recent than the unread message. Therefore it may make sense to give a higher priority to pre-convert unread messages instead of messages that the user has already read or listened to.

A message importance algorithm incorporates a non-adaptive technique that can select a message for pre-conversion from text to speech based on a priority level associated with the message. In some embodiments, an email client or messaging protocol may allow a sender to specify a priority for a given message. For instance a sender might flag a message as "important" or "must read." Such a message can be deemed more likely to be listened to than messages not flagged in this manner, and the algorithm can therefore prioritize messages flagged as important for pre-conversion from text to speech over messages that are not flagged as important.

A sender importance algorithm incorporates a technique for selecting a message for pre-conversion from text to speech based on an identity of the sender of the message, and in some instances based on a relationship of the sender to the user who receives the message. For example, messaging software may be able to query organization information about the user and other users in an organization, such as the user's position in the hierarchy at their place of employment. It can then be determined that the user will more likely want to listen to a message that is sent from an immediate superior or supervisor than from another sender. In some embodiments, a sender importance algorithm can determine that a message received from anyone above the user's immediate superior or supervisor is should be prioritized for pre-conversion from text to speech.

A weighted algorithm can select messages for pre-conversion from text to speech based on a variety of factors, such as any of those discussed above in connection with other algorithms. For example, rather than looking only at a single factor, such as the age of the message, the sender, the topic, or any other specific criteria, a weighted algorithm can instead take all of these possible criteria into consideration. In this technique, a set of messages can be evaluated and each message can be given a weighted predictive score based on a set of different criteria. If a criteria is met for a given message, such as the message being less than a day old, or being an unread message, or being a message sent from a superior at work, then that message can be given a certain value. The weighted predictive score of a message can be the total value of all the criteria that has been met. The set of messages can then be pre-converted to from text to speech based on their respective weighted predictive scores, in order from the highest score to the lowest score.

In contrast to the algorithms described above, a machine learning algorithm can be adaptive, which can allow the machine algorithm to produce better results for a wider variety of users. For example, each user can have different usage patterns, and it may be difficult to find a single non-adaptive pattern that will work for all users, or even for most users. Machine learning can be used as an adaptive way to tailor the prediction of which messages to pre-convert for each user. In some embodiments, every time a user decides to read or listen to a message, metadata about that message can be sent to a machine learning service. The machine learning service can be either remote or local with respect to the user's computing device. The metadata can include criteria such as the age of the message, whether the message was previously unread or read, the sender of the message, or a topic of the message, as well as a link or pointer referring to the metadata of the message that was read or listened to just before this one. Thus, because each read or listened to message can include a link to the previous message read or listened to by the user, an order in which messages are read or listened to by user can be established. In some embodiments, the metadata for all unread and un-listened messages also can be sent to the machine learning service. Based on this input about the messages, the machine learning service can use any number of machine learning techniques to more accurately predict the next message that the user will wish to listen to in the future.

For example, the machine learning service may discover a first user prefers to read or listen to messages mostly in a threaded fashion, except on Mondays when the first user prefers to read or listen to messages that the first user missed over the weekend in the order in which they were received. In another example, the machine learning service can determine that a second user prefers to always read or listen to unread messages from most recent to oldest. In some embodiments, only metadata about each message is sent to the machine learning service, while the actual content of the messages, which may be sensitive or confidential, is not sent to the machine learning service. Furthermore, personal identification of each user also may not be sent to the machine learning service. In some other embodiments, any potentially sensitive information can be encrypted or hashed before it is sent to the machine learning service. As a result, privacy can be assured to all users, since the identity of the senders and recipients of the messages can be encrypted or hashed before being sent to the machine learning service. This can make using a third-party remote machine learning service more practical, because there is less risk of sensitive information being obtained by a fraudster or hacker who gains unauthorized access to information that has been sent to the machine learning service.

One aspect of this disclosure is directed to a system for prioritizing messages for conversion from text to speech. The system includes a message manager executing on a device. The message manager is configured to identify a plurality of messages accessible via the device. The message manager is configured to determine, for each message of the plurality of messages, a conversion score based on one or more parameters of each message. The conversion score can indicate a priority of each message to convert from text to speech. The message manager is configured to identify a message of the plurality of messages for transmission to a text-to-speech converter for converting the message from text to speech. The message can be identified based on at least the conversion score of the message. The message manager is also configured to receive, from the text-to-speech converter, speech data of the message to play via an audio output of the device.

In some embodiments, at least one parameter of the one or more parameters of each message can include a length of time since each message was transmitted or received. In some embodiments, to determine the conversion score for each message, the message manager is further configured to determine the conversion score for each message based on the length of time since each message was transmitted or received.

In some embodiments, to determine the conversion score for each message, the message manager is further configured to identify that each message is included in a message thread including multiple messages and determine that at least one of the multiple messages has been read. In some embodiments, at least one parameter of the one or more parameters of each message can include a read status parameter indicating that the message was either read or unread. In some embodiments, to determine the conversion score for each message, the message manager is further configured to determine the conversion score for each message based on the read status parameter.

In some embodiments, at least one parameter of the one or more parameters of each message comprises a message importance parameter indicating an importance level of each message. The message importance parameter can be provided by a sender of each message. In some embodiments, to determine the conversion score for each message, the message manager is further configured to determine the conversion score for each message based on the message importance parameter.

In some embodiments, the message manager is further configured to determine a sender of each message of the plurality of messages and a relationship of the sender to the recipient of each message. In some embodiments, to determine the conversion score for each message, the message manager is further configured to determine the conversion score for each message based on the determined relationship.

In some embodiments, to determine, for each message of the plurality of messages, a conversion score, the message manager is further configured to determine, for each message of the plurality of messages, a conversion score based on a length of time since the message was transmitted or received, whether or not the message is part of a message thread, a read status parameter indicating that the message was either read or unread, or a message importance parameter indicating an importance level of the message. The message importance parameter can be provided by a sender of the message. In some embodiments, the message manager is further configured to determine, a relationship between the sender and the recipient of the message.

In some embodiments, the message manager is further configured to transmit, to a machine learning system, data indicating that at least one message of the plurality of messages was accessed via the device. The message manager also can be configured to receive, from the machine learning system, an indicator identifying the message as the message to transmit for converting from text to speech. In some embodiments, to transmit, to the machine learning system, data indicating that at least one message of the plurality of messages was accessed via the device, the message manager is further configured to transmit, to the machine learning system, responsive to each message of the plurality of messages that is accessed via the device, encrypted data corresponding to each message accessed via the device. The encrypted data can be generated by the device according to an encryption policy. In some embodiments, the plurality of messages can belong to an account of a mail application executing on the device.

Another aspect of this disclosure is directed to a method for prioritizing messages for conversion from text to speech. The method can include identifying, by a device, a plurality of messages accessible via the device. The method can include determining, by the device, for each message of the plurality of messages, a conversion score based on one or more parameters of each message. The conversion score can indicate a priority of each message to convert from text to speech. The method can include identifying, by the device, a message of the plurality of messages for transmission to a text-to-speech converter for converting the message from text to speech. The message can be identified based on at least the conversion score of the message. The method can include receiving, by the device from the text-to-speech converter, speech data of the message to play via an audio output of the device.

In some embodiments, at least one parameter of the one or more parameters of each message can include a length of time since each message was transmitted or received. In some embodiments, determining the conversion score for each message can include determining the conversion score for each message based on the length of time since each message was transmitted or received.

In some embodiments, determining, for each message of the plurality of messages, a conversion score based on one or more parameters of each message can further include identifying that each message is included in a message thread including multiple messages and determining that at least one of the multiple messages has been read. In some embodiments, at least one parameter of the one or more parameters of each message can include a read status parameter indicating that the message was either read or unread. Determining the conversion score for each message can include determining the conversion score for each message based on the read status parameter. In some embodiments, at least one parameter of the one or more parameters of each message can include a message importance parameter indicating an importance level of each message. The message importance parameter can be provided by a sender of each message. Determining the conversion score for each message can include determining the conversion score for each message based on the message importance parameter. In some embodiments, the method can further include determining, by the device, a sender of each message of the plurality of messages and a relationship of the sender to the recipient of each message. Determining the conversion score for each message can include determining the conversion score for each message based on the determined relationship.

In some embodiments, determining, for each message of the plurality of messages, a conversion score can include determining, for each message of the plurality of messages, a conversion score based on a length of time since the message was transmitted or received, whether or not the message is part of a message thread, a read status parameter indicating that the message was either read or unread, or a message importance parameter indicating an importance level of the message. The message importance parameter can be provided by a sender of the message. In some embodiments, the method can include determining a relationship between the sender and the recipient of the message.

In some embodiments, the method can further include transmitting, by the device, to a machine learning system, data indicating that at least one message of the plurality of messages was accessed via the device. The method also can include receiving, by the device, from the machine learning system, an indicator identifying the message as the message to transmit for converting from text to speech. In some embodiments, transmitting, to the machine learning system, data indicating that at least one message of the plurality of messages was accessed via the device can include transmitting, to the machine learning system, responsive to each message of the plurality of messages that is accessed via the device, encrypted data corresponding to each message accessed via the device. The encrypted data can be generated by the device according to an encryption policy. In some embodiments, the plurality of messages can belong to an account of a mail application executing on the device.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
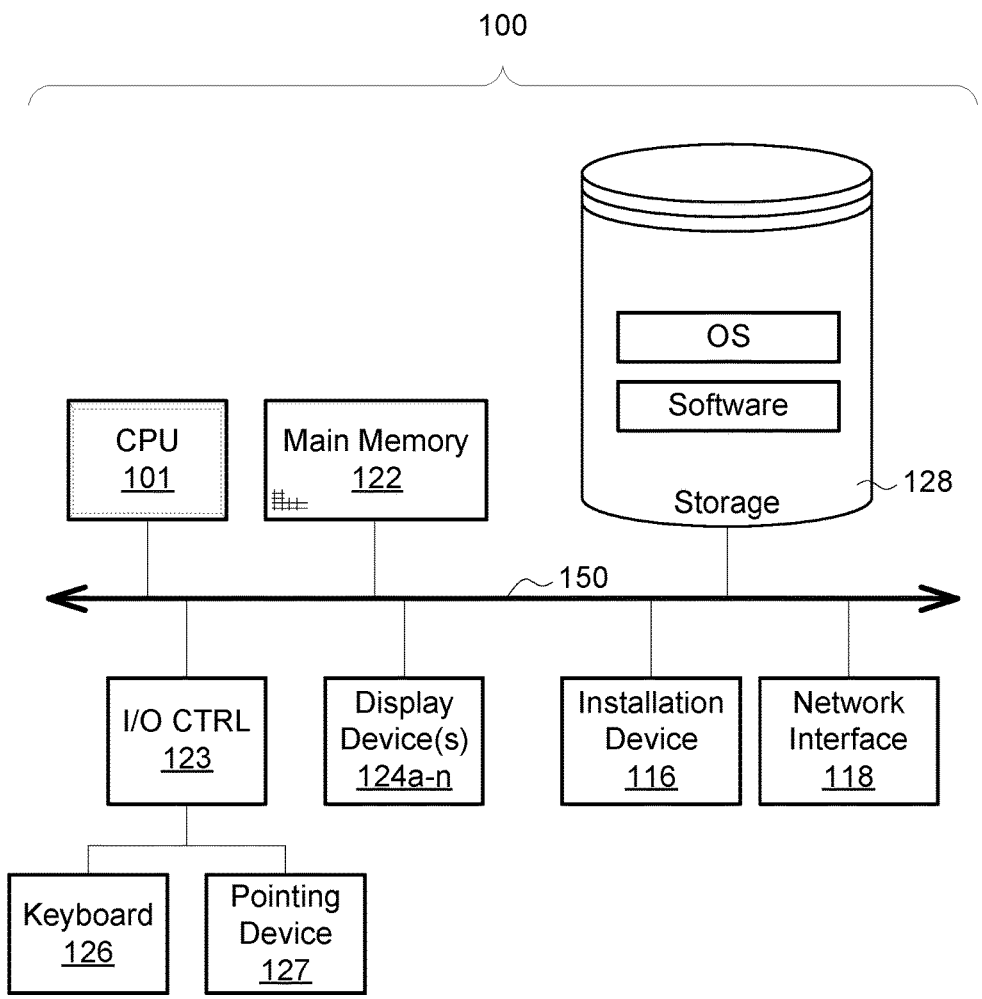
FIGS. 1A-1D are block diagrams of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for prioritizing messages for conversion from text to speech based on predictive user behavior.

A. Computing Environment

Figure 1B:
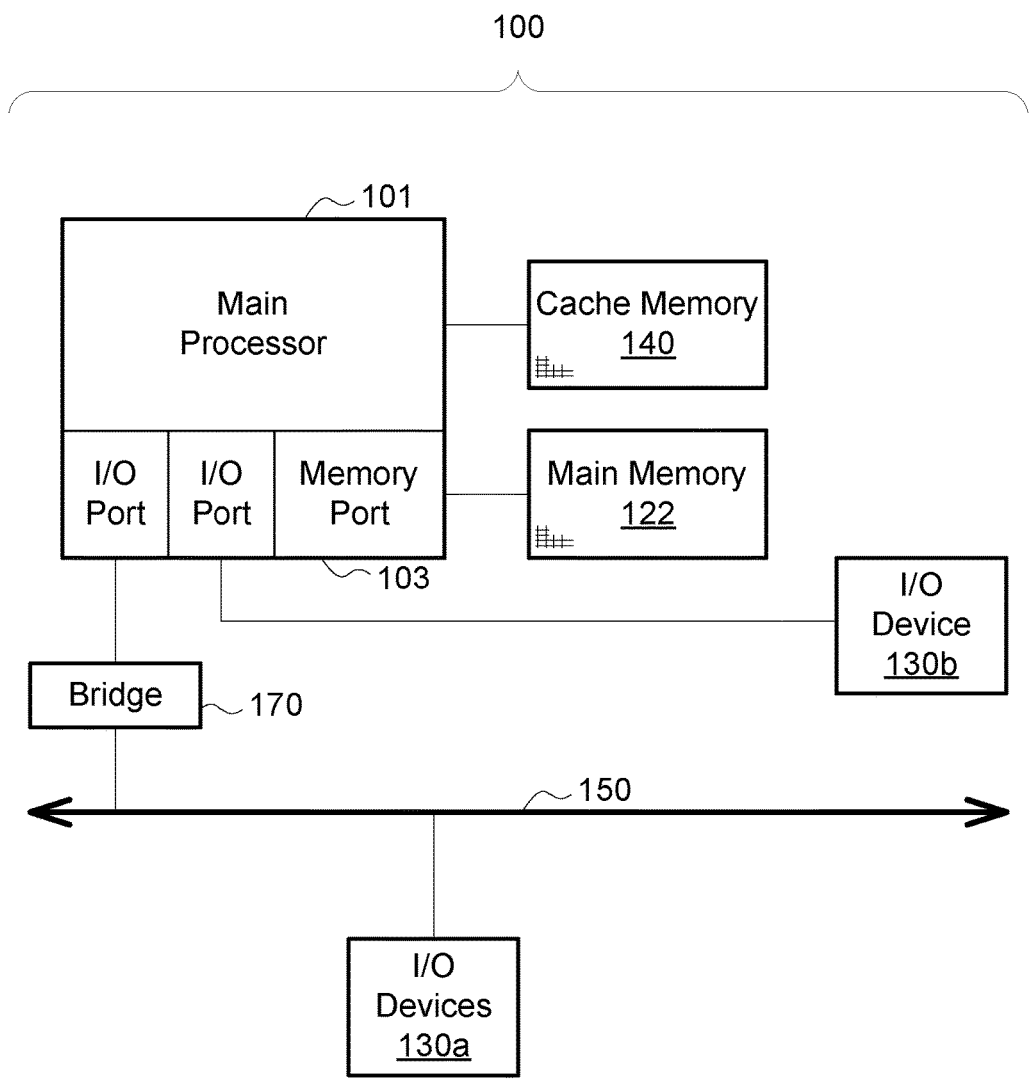

Prior to discussing the specifics of embodiments of the systems and methods of an appliance and/or client, it may be helpful to discuss the computing environments in which such embodiments may be deployed. FIGS. 1A and 1B depict block diagrams of a computing device 100 useful for practicing embodiments of the systems and devices described further below in Section B. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101. In some embodiments, the input/output devices 130a-130b can include audio output devices, such as a speaker, headphones, or an audio output port configured to communicatively couple with an external audio output device.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Samsung Electronics of Suwon, Korea; those manufactured by Micron Technology of Boise, Id.; those manufactured by Transmeta Corporation of Santa Clara, Calif.; those manufactured by International Business Machines of White Plains, N.Y.; or those manufactured by Advanced Micro Devices of Sunnyvale, Calif., among others. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a CD-ROM drive, a CD-R/RW drive, a DVD-ROM drive, tape drives of various formats, USB device, hard-drive or any other device suitable for installing software and programs. The computing device 100 may further comprise a storage device 128, such as one or more hard disk drives or redundant arrays of independent disks, for storing an operating system and other related software, and for storing application software programs. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. or SanDisk Corporation of Milpitas, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 may be a smartphone or a tablet, such as those developed by Apple Inc., by Samsung Electronics, by Xiaomi. Inc., or by Google Inc., among others. In this embodiment, the smartphone or tablet may be operated under the control of an operating system (such as Android or iOS) and may include a stylus input device as well as a touch sensitive screen. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1C:
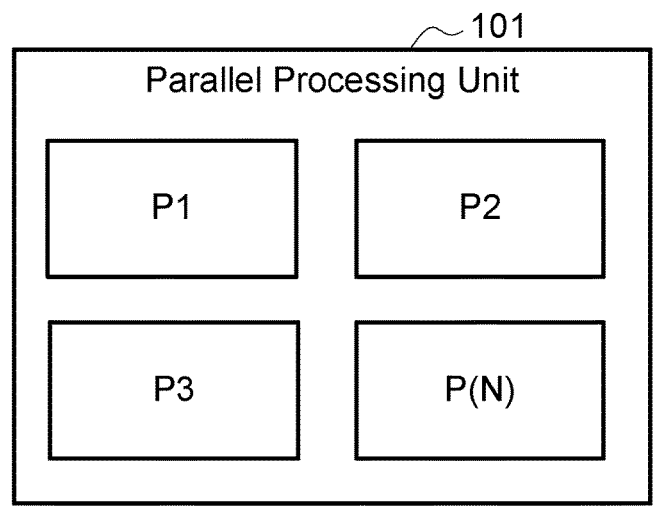

As shown in FIG. 1C, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a Cell Broadband Engine architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1D:
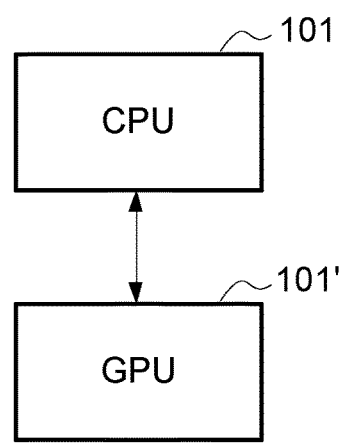

In some embodiments, the computing device 100 may comprise a graphics processing unit. In one of these embodiments depicted in FIG. 1D, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Prioritizing Messages for Conversion from Text to Speech

Described below are techniques for prioritizing messages for conversion from text to speech. The present systems and methods may be used to automatically select a set of text-based messages for conversion to speech, and also may select an order in which the selected messages should be converted. The selected messages can be delivered from a computing device on which they are stored to a text-to-speech converter even before a user has requested that the messages be converted. In some embodiments, the order in which the messages are selected for conversion into speech can be determined based on predicted behavior of the user.

In some embodiments, a user may access a device that executes a software application configured to allow the user to read text-based messages, such as emails and text messages. In some embodiments, a software application may not have text-to-speech capabilities built-in. Instead, the application may make a remote network call to do the conversion, by sending a message to a remote software application or hardware device that performs the conversion, and receiving the audio corresponding to the speech conversion from the remote software application or hardware device after the conversion has been performed. Because it may be time-consuming and resource-intensive to perform such conversions, it can be advantageous to first predict which message the user will want to listen to next and to send that particular message for conversion even before the user requests that the message be converted to speech. That way the user will not have to wait for the message to be sent to the cloud, for the conversion, and for the speech data to be sent back. This disclosure provides techniques for performing such a predictive conversion.

In some embodiments, when a system for prioritizing messages for conversion from text to speech has no prior knowledge of the user's habits, it may be beneficial to use a non-adaptive algorithm for predicting which message is likely to be read next by the user. Several non-adaptive algorithms are described in this disclosure. An improved predictive conversion may also be achieved by observing the actual usage pattern of the user. This usage data can be used by a machine-learning service, which can then determine the best pattern for that specific end-user. In some embodiments, the machine learning service can be a "cloud-based" service.

There is currently no way to safely check email on many applications and platforms, such as email clients, while driving in a car or performing other activities that make reading text-based content on a computing device difficult, dangerous, or impossible. There are several challenges to the development of applications that easily allow a user to listen to messages that are received as text-based content. This disclosure provides systems and methods that represent technical solutions to these problems. In particular, one problem is to reduce the footprint of such an application on a computing device (e.g., its size or amount of computing resources required for its execution). To address this, the text-to-speech conversion functionality can be off-loaded to a remote service. Otherwise the application would need to include all of the logic and data for text-to-speech conversion, for potentially multiple languages, which would make the application too burdensome for many computing devices. Off-loading the text-to-speech conversion to a remote service has many other benefits as well, such as allowing for the use of a variety of different text-to-speech services. In addition, a single remote service for text-to-speech conversion could receive information related to users' interaction with text-based messages from a large number of users. As a result, the dataset to which the remote service applies machine learning techniques can be significantly larger, and can grow more rapidly, relative to an arrangement in which the text-to-speech conversion is performed by logic executing on each individual user's computing device. Because machine learning systems typically learn more quickly and achieve better outcomes with larger input datasets, such a remote service for text-to-speech conversion can be beneficial.

One potential downside to using a remote text-to-speech converter is that it can take a noticeable amount of time to send the message over the network to the remote service, for it to be converted, and then for it to be transmitted back to the device. Therefore, it can be advantageous to do predictive text-to-speech conversion of messages, up to the limit of the cost of the conversion as well as the amount of storage available to pre-cache the converted messages into audio format. Various techniques for selecting a message to be pre-converted to audio can be loosely categorized as either "non-adaptive" and "adaptive." The term "non-adaptive" is used in this disclosure to describe algorithms for predictive conversion that do not change over time in response to input. Conversely, the term "adaptive" is used in this disclosure to refer to an algorithm that may change over time in response to input.

Several types of non-adaptive algorithms are described herein. For example, a temporal algorithm can be non-adaptive. Such an algorithm for determining which message or messages to pre-convert from text to speech in advance of the user actually deciding to read (or listen to) the message can be based on the age of the message. More particularly, the decision to pre-convert a message can be based on when the message was sent or received. As an example, there are many email clients that present messages from most recent to least recent. It can be presumed that pre-converting the messages from most recent to least recent may be desirable, to the limit of how much pre-caching is desired, as many users typically read their most recent email messages first.

A threaded algorithm incorporates a non-adaptive mechanism for determining which message to pre-convert based on "threads" of messages. A thread of messages is used in this disclosure to denote a chain of back-and-forth messages, typically between the same set of recipients, regarding a specific topic or category. Once an end-user reads one message from a thread, it can be assumed that there is a higher likelihood that the user will soon read another message from the same thread, even if that message occurred much later in the past.

An "unread" algorithm incorporates a non-adaptive technique that can determine whether to pre-convert a message from text to speech based on whether the message is marked as read (e.g., already viewed by the user) or unread (e.g., not yet viewed). For example, in many instances it is more likely for a user to elect to read (or listen to) a message that the user has never seen or listened to before, rather than one that they have already seen or listened to, even if the read message is more recent than the unread message. Therefore it may make sense to give a higher priority to pre-convert unread messages instead of messages that the user has already read or listened to.

A message importance algorithm incorporates a non-adaptive technique that can select a message for pre-conversion from text to speech based on a priority level associated with the message. In some embodiments, an email client or messaging protocol may allow a sender to specify a priority for a given message. For instance a sender might flag a message as "important" or "must read." Such a message can be deemed more likely to be listened to than messages not flagged in this manner, and the algorithm can therefore prioritize messages flagged as important for pre-conversion from text to speech over messages that are not flagged as important.

A sender importance algorithm incorporates a technique for selecting a message for pre-conversion from text to speech based on an identity of the sender of the message, and in some instances based on a relationship of the sender to the user who receives the message. For example, messaging software may be able to query organization information about the user and other users in an organization, such as the user's position in the hierarchy at their place of employment. It can then be determined that the user will more likely want to listen to a message that is sent from an immediate superior or supervisor than from another sender. In some embodiments, a sender importance algorithm can determine that a message received from anyone above the user's immediate superior or supervisor is should be prioritized for pre-conversion from text to speech.

A weighted algorithm incorporates a non-adaptive technique that can select messages for pre-conversion from text to speech based on a variety of factors, such as any of those discussed above in connection with other algorithms. For example, rather than looking only at a single factor, such as the age of the message, the sender, the topic, or any other specific criteria, a weighted algorithm can instead take all of these possible criteria into consideration. In this technique, a set of messages can be evaluated and each message can be given a weighted predictive score based on a set of different criteria. If a criteria is met for a given message, such as the message being less than a day old, or being an unread message, or being a message sent from a superior at work, then that message can be given a certain value. The weighted predictive score of a message can be the total value of all the criteria that has been met. The set of messages can then be pre-converted to from text to speech based on their respective weighted predictive scores, in order from the highest score to the lowest score.

In contrast to the algorithms described above, a machine learning algorithm can be adaptive, which can allow the machine algorithm to produce better results for a wider variety of users. For example, each user can have different usage patterns, and it may be difficult to find a single non-adaptive pattern that will work for all users, or even for most users. Machine learning can be used as an adaptive way to tailor the prediction of which messages to pre-convert for each user. In some embodiments, every time a user decides to read or listen to a message, metadata about that message can be sent to a machine learning service. The machine learning service can be either remote or local with respect to the user's computing device. The metadata can include criteria such as the age of the message, whether the message was previously unread or read, the sender of the message, or a topic of the message, as well as a link or pointer referring to the metadata of the message that was read or listened to just before this one. Thus, because each read or listened to message can include a link to the previous message read or listened to by the user, an order in which messages are read or listened to by user can be established. In some embodiments, the metadata for all unread and un-listened messages also can be sent to the machine learning service. Based on this input about the messages, the machine learning service can use any number of machine learning techniques to more accurately predict the next message that the user will wish to listen to in the future.

For example, the machine learning service may discover a first user prefers to read or listen to messages mostly in a threaded fashion, except on Mondays when the first user prefers to read or listen to messages that the first user missed over the weekend in the order in which they were received. In another example, the machine learning service can determine that a second user prefers to always read or listen to unread messages from most recent to oldest. In some embodiments, only metadata about each message is sent to the machine learning service, while the actual content of the messages, which may be sensitive or confidential, is not sent to the machine learning service. Furthermore, personal identification of each user also may not be sent to the machine learning service. In some other embodiments, any potentially sensitive information can be encrypted or hashed before it is sent to the machine learning service. As a result, privacy can be assured to all users, since the identity of the senders and recipients of the messages can be encrypted or hashed before being sent to the machine learning service.

This can make using a third-party remote machine learning service more practical, because there is less risk of sensitive information being obtained by a fraudster or hacker who gains unauthorized access to information that has been sent to the machine learning service.

Figure 2:
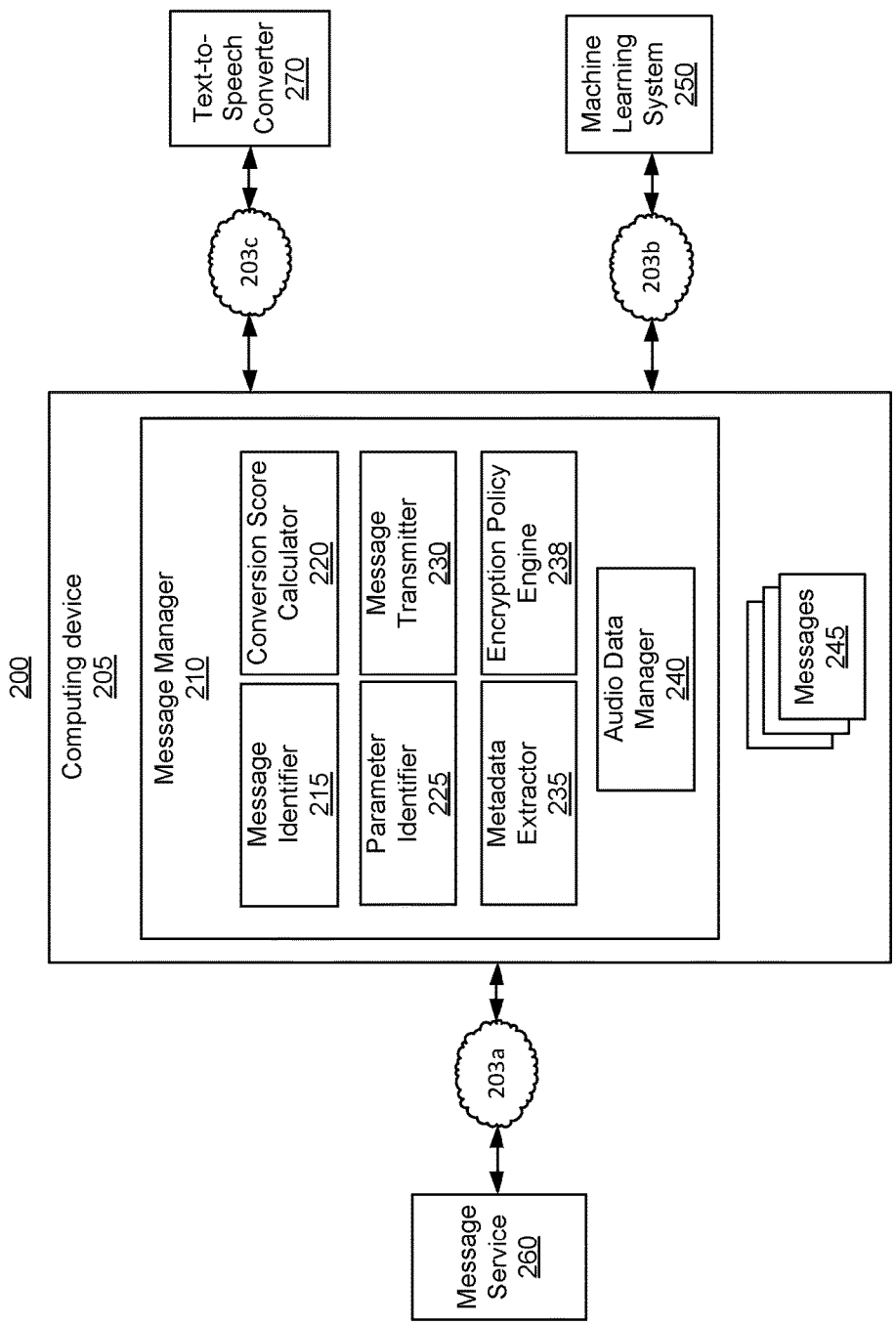
FIG. 2 is a block diagram of an embodiment of a system for prioritizing messages for conversion from text to speech based on predictive user behavior.

Referring now to FIG. 2, depicted a block diagram of an embodiment of a system 200 for prioritizing messages for conversion from text to speech based on predictive user behavior. In brief summary, the system 200 includes a computing device 205 a message service 260, a machine learning system 250, and a text-to-speech converter 270. The computing device 210 further includes a message manager 210 having a message identifier 215, a conversion score calculator 220, a parameter identifier 225, a message transmitter 230, a metadata extractor 235, an encryption policy engine 238, and an audio data manager 240. A plurality of messages 245 are also stored on the computing device 205.

The message manager 210 can be a part of a message application, such as a mail application, executing on the computing device 205. The message application can be an application that is installed on the computing device. The message application can be configured to communicate with one or more message servers that are configured to send and receive messages from one or more of a plurality of message applications installed on a plurality of computing devices, such as the computing device 205. In some embodiments, the message manager 210 may be a standalone entity that is configured to communicate with, access or otherwise interact with one or more message applications executing on the computing device 205.

As shown in FIG. 2, the computing device 205 communicates with the message service 260 via a network 203a. The computing device 205 communicates with the machine learning system 250 via a network 203b. The computing device 205 communicates with the text-to-speech converter 270 via a network 203c. Each of the above-mentioned elements or entities of the system 200 can be implemented in hardware, software, or a combination of hardware and software, in one various embodiments. In some embodiments, each component of the system 200 may be implemented using hardware or a combination of hardware or software detailed above in connection with FIGS. 1A-1D. For instance, in some embodiments, the message manager 210, including the message identifier 215, the conversion score calculator 220, the parameter identifier 225, the message transmitter 230, the metadata extractor 235, and the encryption policy engine 238, can include any application, program, library, script, task, service, process or any type and form of executable instructions executing on hardware of the computing device 205. The hardware can include circuitry such as one or more processors in one or more embodiments. Each of the networks 203a-203c can be any type of network capable of supporting communications between the computing device 205 and the message service 260, the machine learning system 250, and the text-to-speech converter 270, respectively. For example, in some embodiments, the networks 203a-203c can be implemented as any of a local-area network (LAN) (e.g., a company Intranet), a metropolitan area network (MAN), or a wide area network (WAN) (e.g., the Internet). It should also be understood that, while shown as separate components for illustrative purposes in FIG. 2, certain functionality described below in connection with the computing device 205, the message service 260, the machine learning system 250, and the text-to-speech converter 270 could be combined such that the functionality of two or more of these devices depicted in FIG. 2 may be implemented by a single device. For example, in some embodiments, the functionality of the message service 260, the machine learning system 250, and the text-to-speech converter 270 could be performed by a single device in communication with the computing device 205.

In greater detail, the system 200 can be used to prioritize the messages 245 for conversion from text into speech by the text-to-speech 270. Generally, the system 200 can allow a user of the computing device 205 to receive messages having text-based content, such as emails and text messages. For example, the message service 260 can transmit such messages to the computing device 205, and the computing device 205 may store the received messages as the messages 245. In some embodiments, the message service 260 can be an email server. In some other embodiments, the message service 260 can be server or application software associated with any third-party messaging service configured to deliver messages having text-based content to the computing device 205. The computing device 205 can be a mobile phone, a tablet computer, a laptop computer, a desktop computer or the like. In some embodiments, the computing device 205 is configured to permit a user to process the stored messages 245 received from the message service 260. For example, the computing device 205 can be configured to display the text of a given message 245 responsive to inputs received from the user, or to play speech data corresponding to the textual content of a given message 245 via an audio output of the computing device 205, which may be implemented as one or more of the I/O devices 130a or 130b shown in FIG. 1B. In some embodiments, the computing device 205 can execute an email client, text messaging application, or other software program that allows the user to interact with the messages 245 in this manner. In some embodiments, the message manager 210 can be a set of software instructions included within such an application.

The text-to-speech converter 270 can be configured to convert text-based content into audio speech data corresponding to the text-based content. In some embodiments, the text-to-speech converter 270 can implement any algorithm for converting text data to speech data, and may support the conversion of text-based data received in any number of languages to speech data corresponding to the respective language in which the text-based data was received. The text-to-speech converter 270 can be implemented, for example, as a software application executing on a computing device remote from (but in communication with) the computing device 205). Such an arrangement may be beneficial in embodiments in which the computing device 205 may not have sufficient resources to efficiently carry out the conversion of the textual content of the messages 245 to speech, which may be very computationally intensive. Furthermore, because of the computationally intensive nature of performing such conversions, the system 200 can be configured to predict which messages 245 the user will want to listen to next and to send those particular messages 245 to the text-to-speech converter 270 for conversion to speech even before the user of the computing device 205 requests that the messages 245 be converted to speech. With accurate predictions, the user will not have to wait for the selected messages to be sent to the text-to-speech converter 270, for the conversion, and for the speech data to be sent back to the computing device 205 from the text-to-speech converter 270, as the speech data will already be available on the computing device 205 because the prediction allows the textual content of the messages 245 that are most likely to be of interest to the user to be converted to speech in advance.

The components of the message manager 210 can be configured to prioritize the messages 245 in an order in which the user is most likely to want to listen to them by predicting which message 245 the user is most likely to be interested in next, and to manage audio data corresponding to messages that have already been converted. In some embodiments, the message manager 210 can implement a non-adaptive algorithm for predicting which message is likely to be read (or listened to) next by the user. As discussed above a non-adaptive algorithm can be any algorithm for prioritizing messages that does not change over time in response to user behavior. In brief overview, the message manager 210 can implement a non-adaptive algorithm as follows. First the message identifier 215 can identify all of the messages 245 that are stored on the computing device 205 and that the user may want to listen to as speech at some time in the future. Next, for each of the messages 245, the parameter identifier 225 can extract one or more parameters, and the conversion score calculator 220 can calculate a conversion score for each message 245 based on its respective one or more parameters. The conversion score can generally indicate a relative priority with which each message should be converted from text to speech, for example based on how likely the user is to wish to listen to each message. The message identifier 215 can then identify the message 245 having the highest conversion score, and the message transmitter 230 can transmit the identified message to the text-to-speech converter 270 for conversion. The text-to-speech converter 270 converts the text content of the received message to speech data, and returns the speech data to the computing device 205.

The message manager 210 can then store the speech data so that it is available if and when the user of the computing device 205 chooses to listen to it. For example, in some embodiments the audio data manager 240 can be configured to store the speech data. In some embodiments, the audio data manager 240 can store the speech data in a memory element such as the main memory 122 or the storage 128 shown in FIG. 1A, or the cache memory 140 shown in FIG. 1B. As a result, the speech data for converted messages 245 can be pre-cached on the computing device 205 such that it is available to be output via an audio output at a time in the future when the user of the computing device wishes to listen to the speech data. For example, in some embodiments the audio data manager 240 can receive a request to output the speech data responsive to a user input corresponding to a request from the user to play speech data of one or more messages 245. The request from the user can be via an action performed on an interface of the message application executing on the computing device 205. The audio data manager 240 can retrieve the appropriate speech data from the memory element in which it is stored (e.g., the main memory 122 or the storage 128 of FIG. 1A, or the cache memory 140 of FIG. 1B), and can cause the computing device 205 to play audio corresponding to the speech data to allow the user to listen to the selected messages 245. In some embodiments, the message manager 210 can also mark the selected messages 245 as having been read, after the audio corresponding to the speech data of the selected messages 245 has been played by the computing device 205. In some embodiments, the message manager 210 may delete the speech data upon the message being played by the computing device 205 to reduce the amount of speech data stored on the computing device 205. In some embodiments, the message manager 210 or the speech data manager 240 may implement one or more data management policies for deleting speech data based on when the speech data is played or based on an amount of time since the speech data has been stored on the computing device.

The message identifier 215 and the message transmitter 230 can repeat the steps described above for each message 245, according to the conversion scores generated by the conversion score calculator 220, such that the plurality of messages 245 are converted from speech to text in the appropriate order. As each message is converted and the corresponding speech data is transmitted back to the computing device 210 from the text-to-speech converter 270, the audio data manager 240 can cause the speech data to be stored on the computing device 205 until the user requests that the audio be played.

In one example of a non-adaptive algorithm, the message manager 210 can be configured to predict an order in which the messages 245 should be converted into speech based on a respective recency of each message 245 (i.e., the time since each message 245 was received). For example, many people prefer to view (or listen to) their most recent emails or text messages before viewing or listening to older emails or text messages. As such, a recency-based algorithm can be useful to prioritize the messages 245 for conversion from text to speech in the order in which the user is most likely to wish to view or listen to them. To implement such an algorithm, the parameter identifier 225 can extract information from each message 245 corresponding to the time at which the message 245 was received. In some embodiments, such information may be included as a timestamp associated with each message, and the parameter identifier 225 can be configured to parse the messages 245 to extract the timestamp from each message 245. In some embodiments, the parameter identifier 225 can be further configured to process the time stamp to determine recency data for a message 245, for example by determining a duration of time that has elapsed between the current time and the time at which the message 245 was received. For each message 245, the parameter identifier 225 can provide the recency data (e.g., the timestamp or other information corresponding to recency) to the conversion score calculator 220.

The conversion score calculator 220 can then determine the conversion score for each message 245 based on its respective recency data. In general, the conversion score calculator 220 can be configured to assign a relatively higher score a first message 245 that was received more recently than a second message 245. For example, the conversion score calculator can assign a numerical value to each message 245, with higher values indicating more recent receipt. In some embodiments, the conversion score calculator 220 can be configured to assign the same score to two messages 245 even if the two messages 245 were not received at the same time. For example, the conversion score calculator 220 can be configured to assign a conversion score to each message 245 based on the day on which the message 245 was received. Thus, two messages received on the same day but at different times might be assigned the same conversion score. In some other embodiments, the conversion score calculator 220 can use more granular recency data extracted by the parameter identifier 225 to calculate the conversion scores for the messages 245. For example, the conversion score calculator 220 can assign a higher score to a first message 245 that was received at a later time but on the same day as a second message 245.

After the conversion score calculator 220 has determined a conversion score for each message 245, the message identifier 215 can identify the next message 245 to be sent to the text-to-speech converter 270, for example by selecting the message 245 having the highest conversion score. The message transmitter 230 can then send the selected message to the text-to-speech converter 270, and this process can be repeated for additional messages 245 in an order corresponding to their respective conversion scores 220.

In another example of a non-adaptive algorithm, the message manager 210 can be configured to predict an order in which the messages 245 should be converted into speech based on whether each message 245 is part of a thread that appears to be of interest to the user of the computing device 205. For example, once a user has viewed or listened to a first message of a thread, the user may also be more likely to view or listen to other messages in that same thread shortly thereafter. As such, a thread-based algorithm can be useful to prioritize the messages 245 for conversion from text to speech in the order in which the user is most likely to wish to view or listen to them. To implement such an algorithm, the parameter identifier 225 can extract information from each message 245 corresponding to a thread of which the message 245 is a part. In some embodiments, such information may be identified by the parameter identifier 225 based on a subject line of each message. For example, the parameter identifier 225 can examine the subject line of each message 245, and can determine that all messages 245 having a common subject line are part of a common thread. In some embodiments, the parameter identifier 225 can be further configured to determine whether the user has viewed each message 245. This information can then be provided to the conversion score calculator 220, and the conversion score calculator 220 can then assign conversion scores to each message 245 accordingly. For example, the conversion score calculator 220 can be configured to assign a relatively higher score to all messages 245 included in a thread in which at least one message has already been viewed by the user, and a relatively lower score to all messages that either do not belong to any thread, or belong to a thread in which the user has not yet viewed any message 245. As described above, after the conversion score calculator 220 has determined a conversion score for each message 245, the message identifier 215 can identify the next message 245 to be sent to the text-to-speech converter 270, for example by selecting the message 245 having the highest conversion score. The message transmitter 230 can then send the selected message to the text-to-speech converter 270, and this process can be repeated for additional messages 245 in an order corresponding to their respective conversion scores 220.

In yet another example of a non-adaptive algorithm, the message manager 210 can be configured to predict an order in which the messages 245 should be converted into speech based on whether each message 245 has been read by the user of the computing device 205. For example, a user may be more likely to wish to listen to a message that the user has not previously read. Accordingly, an algorithm based on whether the messages 245 have been read can be useful to prioritize the messages 245 for conversion from text to speech in the order in which the user is most likely to wish to view or listen to them. To implement such an algorithm, the parameter identifier 225 can extract information from each message 245 corresponding to whether the message 245 has been read. In some embodiments, each message 245 may include a "read status" flag indicating whether the message 245 is read or unread. The parameter identifier 225 can extract the read status of each message 245, and can provide that information to the conversion score calculator 220. The conversion score calculator 220 can then assign conversion scores to each message 245 accordingly. For example, the conversion score calculator 220 can be configured to assign a relatively higher score to all messages 245 that are unread, and a relatively lower score to all messages 245 that have already been read by the user. As described above, after the conversion score calculator 220 has determined a conversion score for each message 245, the message identifier 215 can identify the next message 245 to be sent to the text-to-speech converter 270, for example by selecting the message 245 having the highest conversion score. The message transmitter 230 can then send the selected message to the text-to-speech converter 270, and this process can be repeated for additional messages 245 in an order corresponding to their respective conversion scores 220.

In still another example of a non-adaptive algorithm, the message manager 210 can be configured to predict an order in which the messages 245 should be converted into speech based on an importance of each message 245. For example, a user may be more likely to wish to listen to more important messages rather than less important messages. Accordingly, an algorithm based on message importance can be useful to prioritize the messages 245 for conversion from text to speech in the order in which the user is most likely to wish to view or listen to them. To implement such an algorithm, the parameter identifier 225 can extract information from each message 245 corresponding to its importance. In some embodiments, each message 245 may include a flag indicating whether the message 245 is important or urgent. The parameter identifier 225 can extract the importance flag information of each message 245, and can provide that information to the conversion score calculator 220. In some other embodiments, the parameter identifier 225 can determine message importance based on the textual content of each message 245. For example, the parameter identifier 225 can parse a message 245 to determine whether the message includes words indicating that the message is important, such as "immediate," "urgent," etc. The parameter identifier 225 can determine that such messages are important, and can transmit that information to the conversion score calculator 220.

The conversion score calculator 220 can then assign conversion scores to each message 245 accordingly. For example, the conversion score calculator 220 can be configured to assign a relatively higher score to all messages 245 that are identified as important, and a relatively lower score to all messages 245 that are not identified as important. As described above, after the conversion score calculator 220 has determined a conversion score for each message 245, the message identifier 215 can identify the next message 245 to be sent to the text-to-speech converter 270, for example by selecting the message 245 having the highest conversion score. The message transmitter 230 can then send the selected message to the text-to-speech converter 270, and this process can be repeated for additional messages 245 in an order corresponding to their respective conversion scores 220.

In a further example of a non-adaptive algorithm, the message manager 210 can be configured to predict an order in which the messages 245 should be converted into speech based on a sender of each message 245. For example, a user may be more likely to wish to listen to messages received from particular senders than from others. Accordingly, an algorithm based on the sender of each message 245 can be useful to prioritize the messages 245 for conversion from text to speech in the order in which the user is most likely to wish to view or listen to them. To implement such an algorithm, the parameter identifier 225 can extract information from each message 245 corresponding to its sender, for example by retrieving such information from a "sender" field or a signature block associated with each message 245. In some embodiments, the parameter identifier 225 can be further configured to determine a relationship between the sender of a message 245 and the user of the computing device 205. For example, in some embodiments, information relating to organizational hierarchy of an organization (e.g., a business) of which the user is a member can be utilized to determine a relationship between the sender of a message 245 and the user of the computing device 205. The parameter identifier 225 can transmit this information to the conversion score calculator 220.

The conversion score calculator 220 can then assign conversion scores to each message 245 accordingly. For example, the conversion score calculator 220 can be configured to assign a relatively higher score to all messages 245 that are identified are received from a particular sender or set of senders, which may include an immediate superior or supervisor of the user of the computing device 205, or any sender having a higher organizational position than the user of the computing device 205. As described above, after the conversion score calculator 220 has determined a conversion score for each message 245, the message identifier 215 can identify the next message 245 to be sent to the text-to-speech converter 270, for example by selecting the message 245 having the highest conversion score. The message transmitter 230 can then send the selected message to the text-to-speech converter 270, and this process can be repeated for additional messages 245 in an order corresponding to their respective conversion scores 220.

It should be appreciated that, while each of the examples of non-adaptive algorithms discussed above focuses on a single factor that can be used in the respective algorithms, in some embodiments the message manager 210 can implement a non-adaptive algorithm that accounts for multiple factors. For example, the algorithm implemented by the message manager 210 to prioritize the messages 245 for conversion from text to speech can account for any combination of factors including the length of time since each message 245 was received, whether each message 245 is part of a thread, a read status of each message 245, an importance of each message 245, a relationship between a sender of each message 245 and the user of the computing device 205, or other such factors. An example of such an algorithm is illustrated in FIG. 3, which illustrates a flow diagram of an embodiment of a method for prioritizing messages for conversion from text to speech based on predictive user behavior.

Figure 3:
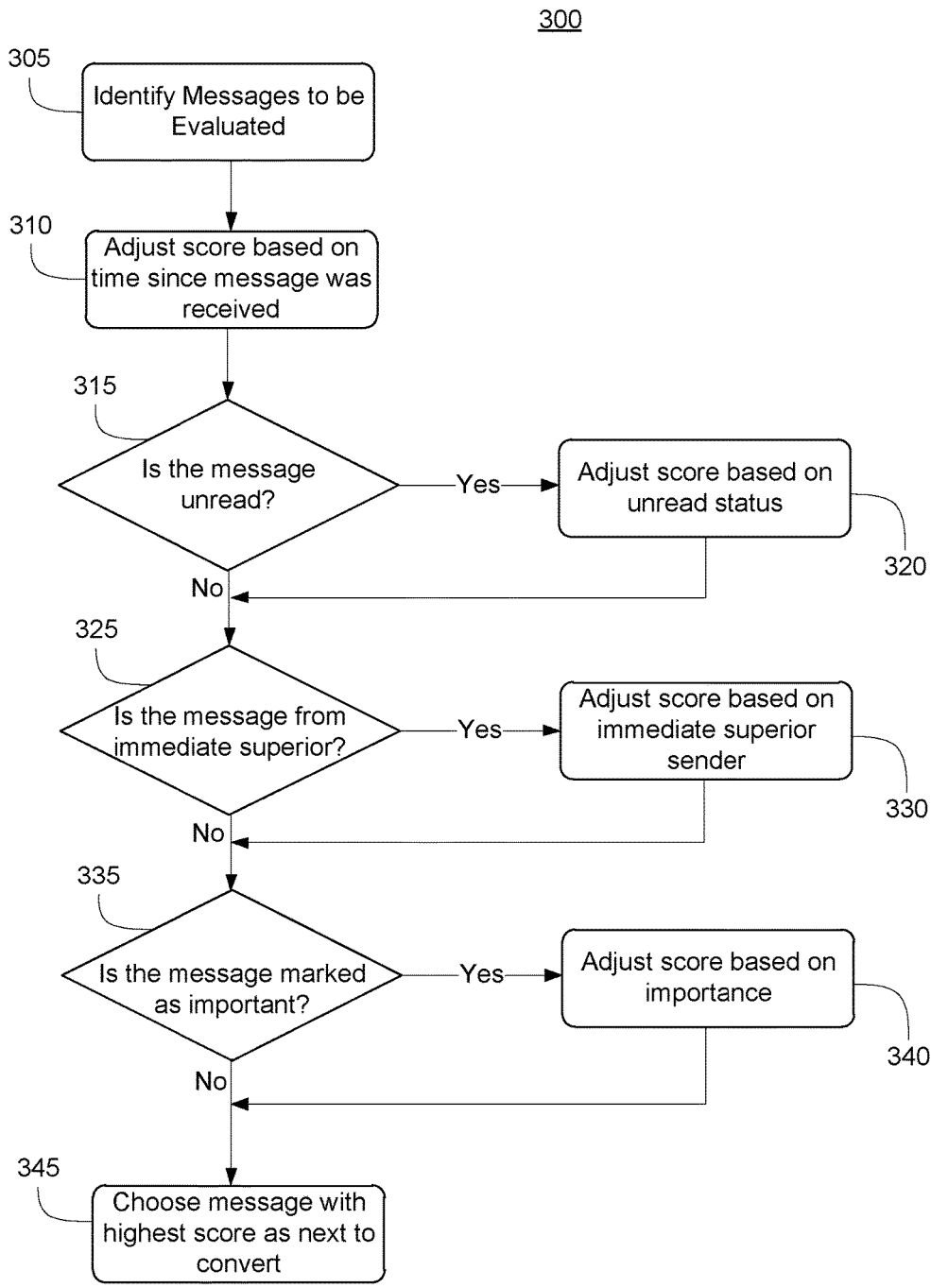
FIG. 3 is a flow diagram of an embodiment of a method for prioritizing messages for conversion from text to speech based on predictive user behavior.

Referring now to FIG. 3, and with reference also to FIG. 2, the method 300 begins at step 305, in which messages to be evaluated are identified, for example by the message identifier 215. At step 310, the conversion score of each message is adjusted based on the time since the message was received (i.e., the recency of the message). In some embodiments, the parameter identifier 225 can extract recency information from each message, and can provide that information to the conversion score calculator 220, which can be configured to adjust the score accordingly. For example, the conversion score calculator 220 can be configured to increase the conversion score if a message is relatively recent, and to decrease the conversion score if the message is older.

Step 315, the parameter identifier 225 can determine whether each message is unread, as described above. If so, the conversion score calculator 220 can adjust the conversion score accordingly at step 320, for example by increasing the conversion score. Otherwise, the conversion score of the message may not be adjusted or increased, and the method 300 proceeds to step 325, in which the parameter identifier 225 determines whether the message was received from an immediate superior of the user of the computing device. If so, the conversion score calculator 220 can adjust the conversion score accordingly at step 330, for example by increasing the conversion score. Otherwise, the conversion score of the message may not be adjusted or increased, and the method 300 proceeds to step 335, in which the parameter identifier 225 determines whether the message is deemed important. If so, the conversion score calculator 220 can adjust the conversion score accordingly at step 340, for example by increasing the conversion score. Finally, at step 345, the message identifier 215 can choose the message having the highest conversion score as the next message to convert, and the identified message can be sent to the text-to-speech converter 270 by the message transmitter 230. Thus, the method 300 allows the conversion score of each message to be determined in a manner that accounts for a variety of factors relating to each message, such as recency, unread status, sender, and importance. In some embodiments, the conversion score calculator 220 can apply a weighting factor each time it adjusts the conversion score of a message at steps 310, 320, 330, and 340. For example, the conversion score calculator 220 can be configured to apply a weight associated with each of the recency, unread status, sender, and importance factors, such that some of these factors may influence the conversion score of a message more heavily than others.

Referring again to FIG. 2, the message manager 210 also can be configured to assist with the embodiment of one or more adaptive algorithms for prioritizing messages 245 to be converted from text to speech. For example, the message manager 210 can cooperate with the machine learning system 250. Machine learning can be used as an adaptive way to tailor the prediction of which messages to pre-convert for the user of the computing device 205, based on the user's specific habits. For example, machine learning can help to select the weights to be applied to an algorithm similar to that shown in FIG. 3 for each factor that is accounted for in the algorithm, and these weights can be updated over time in response to changes in the user's behavior.

In some embodiments, the machine learning system 250 can use information provided by the parameter identifier 225, as well as information provided by the metadata extractor 235, to determine an algorithm to use for prioritizing the messages 245 for conversion from speech to text. For example, each time the user of the computing device 210 reads or listens to a message 245, metadata about that message 245 can be sent to the machine learning system 250. The metadata can include any of the information described above in connection with the functionality of the parameter identifier 225, such as the recency of the message 245, the read status of the message 245, the sender of the message 245, or the priority of the message 245. In some embodiments, the metadata also can include additional information, such as a link or pointer referring to the previous message read or listened to. Such information can be extracted from the messages 245 or otherwise generated by the metadata extractor 235. As the metadata for a given message 245 includes a link or a pointer to the previous message read or listened to by the user, an order in which messages are read or listened to by the user can be established based on the metadata. In some embodiments, the metadata for all unread and un-listened messages included in the messages 245 also can be sent to the machine learning system 250. The machine learning system 250 can use various machine learning techniques to refine an algorithm used to predict the order in which the user will want to read or listen to messages in the future, such as the algorithm 300 shown in FIG. 3. This process is described further below in connection with FIG. 4, which illustrates a sequence diagram 400 showing the flow of information between components of the system of FIG. 2.

Figure 4:
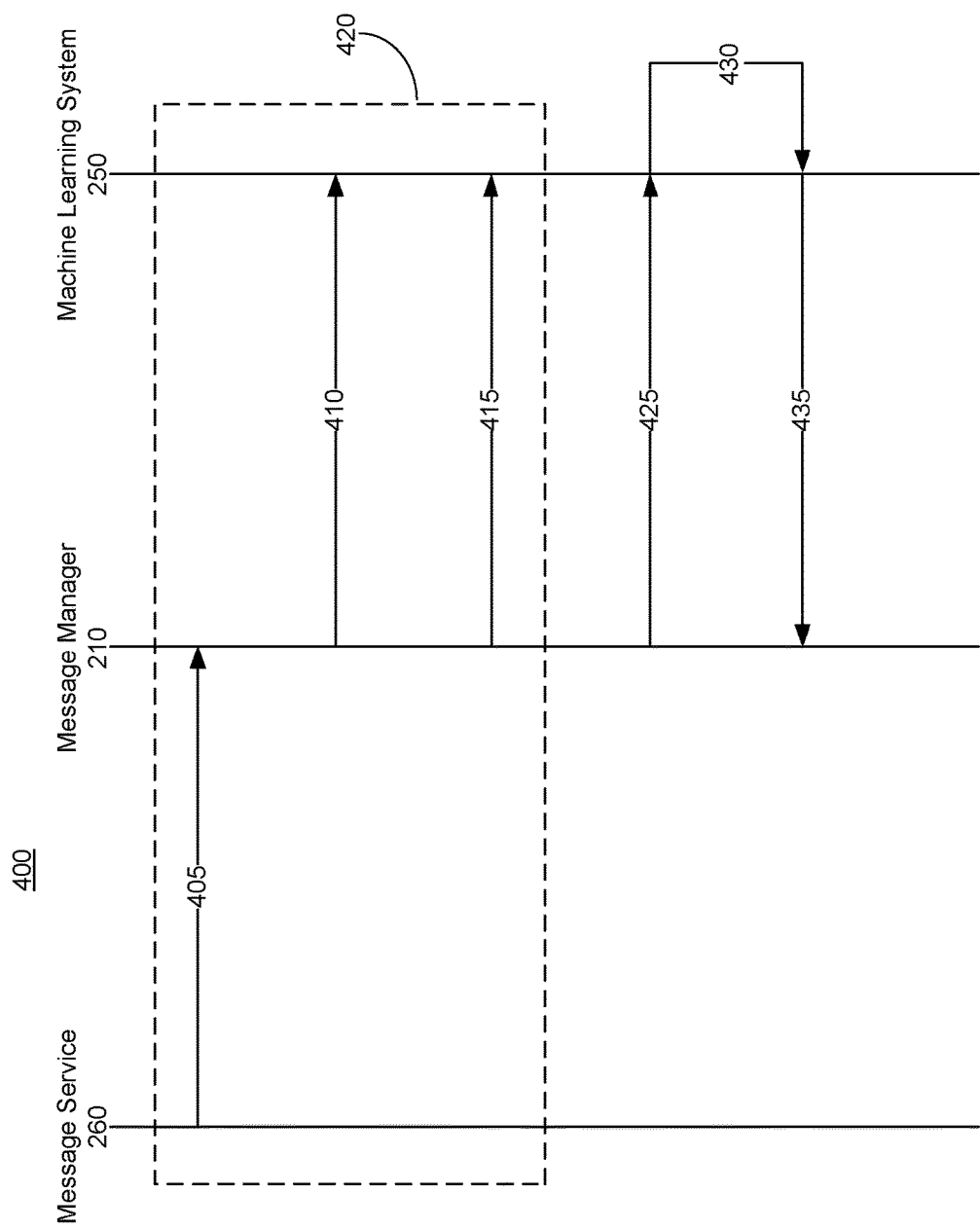
FIG. 4 is a sequence diagram showing the flow of information between components of the system of FIG. 2.

Referring now to FIG. 4, and with reference also to FIG. 2, the sequence diagram shows the flow of information between the message service 260, the message manager 210, and the machine learning system 250 for fine-tuning an algorithm used to predict an order in which the user will want to read or listen to messages. Generally, in the sequence diagram 400, arrows represent information transmitted between these components, and arrows appearing closer to the top of the sequence diagram 400 represent information sent earlier in time than arrows appearing closer to the bottom of the sequence diagram 400. As shown, at step 405, the message service 260 sends information corresponding to a new message to the message manager 210, which executes on the computing device 205. It should be appreciated that this may occur on a scheduled or periodic basis, or alternatively may happen on an asynchronous basis whenever the message service 260 receives a new message addressed to the user of the computing device 205. At step 410, the message manager 210 sends metadata for the received message to the machine learning service 250. As discussed above, the metadata can include information such as the recency of the message, the sender of the message, or the priority of the message. If the user later reads the message, then the message manager 210 sends updated metadata indicating that the message was read, as well as a link or pointer referring to the previous message read or listened to by the user of the computing device 205, to the machine learning service 250 at step 415. In some embodiments, the steps 405, 410, and 415 shown inside the box labeled 420 can be repeated in a continuous loop, thereby allowing the machine learning service 250 to continually receive updated metadata relating to new messages received over time.

At step 425, the message manager 210 can transmit information to the machine learning system 250 corresponding to a request for an updated algorithm to predict the order in which the user will want to read or listen to messages in the future. At step 430, the machine learning system uses all of the stored metadata to determine an updated algorithm, and at step 435, the machine learning system transmits the updated algorithm to the message manager 210, which can then implement the algorithm as described above. In some embodiments, the updated algorithm information can include information relating to the weights to be applied to for each factor (e.g., recency, read status, importance, etc.) of a message by the conversion score calculator 220 to determine the conversion score for the message. Thus, the machine learning system can apply machine learning techniques to determine weighting factors that, when applied to an algorithm, produce conversion scores for a set of messages that match the order in which the messages were actually read on the computing device 205, based on the metadata received from the message manager 210. Stated another way, the updated algorithm should produce higher conversion scores when applied to messages that were actually read earlier, and lower conversion scores when applied to messages that were actually read later.

It should be appreciated that, in the process described above, only metadata about each message is sent to the machine learning system 250. The actual content of the messages is not sent to the machine learning service 250, because the message content is not required for the machine learning service to perform its functionality of providing an updated algorithm. Thus, confidential information included in the content of each message, as well as other personal identification information for the user of the computing device 205, need not be transmitted to the machine learning system 250, which enhances the overall security posture of the system 200 of FIG. 2. In some embodiments, the information sent to the machine learning system 250 or to the text-to-speech converter 270 can be encrypted or hashed prior to transmission to further increase privacy and data security within the system 200. In some embodiments, the encryption policy engine 238 can be configured to encrypt such information prior to transmission according to a set of one or more encryption policies. For example, the encryption policy engine 238 may implement a policy under which any information relating to the content of a message (e.g., the textual content information sent to the text-to-speech converter 270) must be encrypted prior to transmission, while less sensitive information (e.g., the metadata sent to the machine learning system 250) may remain unencrypted. In some other embodiments, the encryption policy engine 238 may implement a policy under which all information transmitted to either the machine learning system 250 or the text-to-speech converter 270 is encrypted prior to transmission. In some embodiments, the encryption policy engine 238 also can be configured to decrypt any encrypted information received from the machine learning system 250 or the text-to-speech converter 270.

Figure 5:
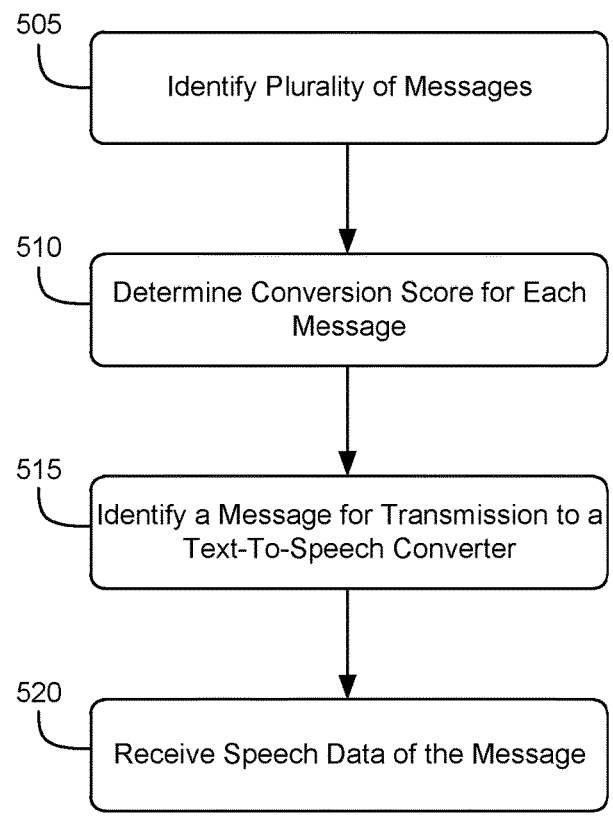
FIG. 5 is a flow diagram of an embodiment of a method for prioritizing messages for conversion from text to speech based on predictive user behavior.

FIG. 5 is a flow diagram of an embodiment of a method 500 for prioritizing messages for conversion from text to speech based on predictive user behavior. In some embodiments, the method 500 can be performed by a system such as the system 200 shown in FIG. 2. In brief overview, the method includes identifying a plurality of messages (step 505), determining a conversion score for each message (step 510), identifying a message for transmission to a text-to-speech converter (step 515), and receiving speech data of the message (step 520).

Referring again to FIG. 5, and with reference also to FIG. 2, the method 500 includes identifying a plurality of messages (step 505). In some embodiments, this step can be performed by a message identifier such as the message identifier 215 of FIG. 2. The message identifier can be configured to identify the plurality of messages including any text-based messages stored on a user's computing device (such as the messages 245), which the user may later wish to listen to as speech rather than reading as text. For example, the identified messages can include text messages or emails that the user may want to hear rather than read.

The method 500 also includes determining a conversion score for each message (step 510). In some embodiments, the conversion score can be determined by a conversion score calculator such as the conversion score calculator 220 shown in FIG. 2. In some embodiments, the conversion score can be calculated based on one or more parameters associated with each message, which may be identified, for example, by the parameter identifier 225. The conversion score calculator 220 can calculate a respective conversion score indicating a relative priority with which each message should be converted from text to speech. In some embodiments, the respective conversion scores can be numerical values representing how likely the user is to wish to listen to each message, based on the one or more parameter values associated with each message.

For example, the conversion score calculator can be configured to assign a relatively higher score a first message that was received more recently than a second message. The conversion score calculator can also be configured to assign a relatively higher score to all messages included in a thread in which at least one message has already been viewed by the user, and a relatively lower score to all messages that either do not belong to any thread, or belong to a thread in which the user has not yet viewed any message. The conversion score calculator can also be configured to assign a relatively higher score to all messages that are unread, and a relatively lower score to all messages that have already been read by the user. The conversion score calculator can also be configured to assign a relatively higher score to all messages that are identified as important, and a relatively lower score to all messages that are not identified as important. the conversion score calculator can be configured to assign a relatively higher score to all messages that are identified are received from a particular sender or set of senders, which may include an immediate superior or supervisor of the user of the computing device 205, or any sender having a higher organizational position than the user of the computing device 205.

In some embodiments, the conversion score calculator can calculate conversion scores based on a combination of multiple factors. For example, any of the factors described above can be accounted for by the conversion score calculator when determining a conversion score for a given message. In some embodiments, the conversion score calculator also can be configured to assign a weight to any of these factors, such that some factors may more strongly influence the conversion score of a message than other factors. In some embodiments, the weights for each factor can be determined using machine learning techniques, as described above in connection with FIG. 4.

The method 500 also includes identifying a message for transmission to a text-to-speech converter (step 515). In some embodiments, this step can be performed by a message identifier such as the message identifier 215 shown in FIG. 2. Generally, the message identifier can identify the message to be transmitted to the text-to-speech converter as the message having the highest conversion score. The identified message can be transmitted to the text-to-speech converter for conversion into speech data. The text-to-speech converter converts the text content of the message to speech data, and returns the speech data to the computing device where it is received at step 520. The device can then store the speech data so that it is available if and when the user of the computing device chooses to listen to it. For example, as described above, an audio data manager such as the audio data manager 240 shown in FIG. 2 can be configured to store the speech data. In some embodiments, the audio data manager can store the speech data in a memory element of the computing device. In some embodiments, the audio data manager can also cause the speech data to be played via an audio output of the computing device responsive to a user input corresponding to a request from the user to play speech data of one or more messages.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A system for prioritizing messages for conversion from text to speech, comprising:
   a message manager executing on a device configured to:
   identify a plurality of messages accessible via the device;
   determine, for each message of the plurality of messages, a conversion score based on one or more parameters of each message, the conversion score indicating a priority of each message to convert from text to speech, wherein to determine the conversion score, the message manager is configured to
   i) determine the conversion score for each message based on a length of time since each message was transmitted or received;
   ii) identify that each message is included in a message thread including multiple messages and determine that at least one of the multiple messages has been read;
   iii) determine the conversion score for each message based on a read status parameter indicating that the message was either read or unread; or
   iv) determine a sender of each message of the plurality of messages and a relationship of the sender to the recipient of each message and determine the conversion score for each message based on the determined relationship;
   identify a message of the plurality of messages for transmission to a text-to-speech converter for converting the message from text to speech, the message identified based on at least the conversion score of the message; and receive, from the text-to-speech converter, speech data of the message to play via an audio output of the device.

2. The system of claim 1, wherein at least one parameter of the one or more parameters of each message comprises a message importance parameter indicating an importance level of each message, the message importance parameter provided by a sender of each message, and wherein to determine the conversion score for each message, the message manager is further configured to determine the conversion score for each message based on the message importance parameter.

3. The system of claim 1, wherein to determine, for each message of the plurality of messages, a conversion score, the message manager is further configured to determine, for each message of the plurality of messages, a conversion score based on i) a length of time since the message was transmitted or received, ii) whether or not the message is part of a message thread, iii) a read status parameter indicating that the message was either read or unread, iv) a message importance parameter indicating an importance level of the message, the message importance parameter provided by a sender of the message, and v) a relationship between the sender and the recipient of the message.

4. The system of claim 1, wherein the message manager is further configured to:

transmit, to a machine learning system, data indicating that at least one message of the plurality of messages was accessed via the device; and receive, from the machine learning system, an indicator identifying the message as the message to transmit for converting from text to speech.

5. The system of claim 4, wherein to transmit, to the machine learning system, data indicating that at least one message of the plurality of messages was accessed via the device, the message manager is further configured to transmit, to the machine learning system, responsive to each message of the plurality of messages that is accessed via the device, encrypted data corresponding to each message accessed via the device, the encrypted data generated by the device according to an encryption policy.

6. The system of claim 1, wherein the plurality of messages belong to an account of a mail application executing on the device.

7. A method for prioritizing messages for conversion from text to speech, comprising:

identifying, by a device, a plurality of messages accessible via the device;

determining, by the device, for each message of the plurality of messages, a conversion score based on one or more parameters of each message, the conversion score indicating a priority of each message to convert from text to speech, wherein determining the conversion score comprises i) determining the conversion score for each message based on a length of time since each message was transmitted or received;

ii) identifying that each message is included in a message thread including multiple messages and determining that at least one of the multiple messages has been read;

iii) determining the conversion score for each message based on a read status parameter indicating that the message was either read or unread; or iv) determining a sender of each message of the plurality of messages and a relationship of the sender to the recipient of each message and determining the conversion score for each message based on the determined relationship;

identifying, by the device, a message of the plurality of messages for transmission to a text-to-speech converter for converting the message from text to speech, the message identified based on at least the conversion score of the message; and receiving, by the device from the text-to-speech converter, speech data of the message to play via an audio output of the device.

8. The method of claim 7, wherein at least one parameter of the one or more parameters of each message comprises a message importance parameter indicating an importance level of each message, the message importance parameter provided by a sender of each message, and wherein determining the conversion score for each message comprises determining the conversion score for each message based on the message importance parameter.

9. The method of claim 7, wherein determining, for each message of the plurality of messages, a conversion score comprises determining, for each message of the plurality of messages, a conversion score based on i) a length of time since the message was transmitted or received, ii) whether or not the message is part of a message thread, iii) a read status parameter indicating that the message was either read or unread, iv) a message importance parameter indicating an importance level of the message, the message importance parameter provided by a sender of the message, and v) a relationship between the sender and the recipient of the message.

10. The method of claim 7, further comprising:

transmitting, by the device, to a machine learning system, data indicating that at least one message of the plurality of messages was accessed via the device; and receiving, by the device, from the machine learning system, an indicator identifying the message as the message to transmit for converting from text to speech.

11. The method of claim 10, wherein transmitting, to the machine learning system, data indicating that at least one message of the plurality of messages was accessed via the device comprises transmitting, to the machine learning system, responsive to each message of the plurality of messages that is accessed via the device, encrypted data corresponding to each message accessed via the device, the encrypted data generated by the device according to an encryption policy.

12. The method of claim 7, wherein the plurality of messages belong to an account of a mail application executing on the device.

* * * * *